May 10, 1938.  H. WOCHNER  2,117,073
WHEEL BALANCING MECHANISM
Filed July 15, 1935  2 Sheets-Sheet 1
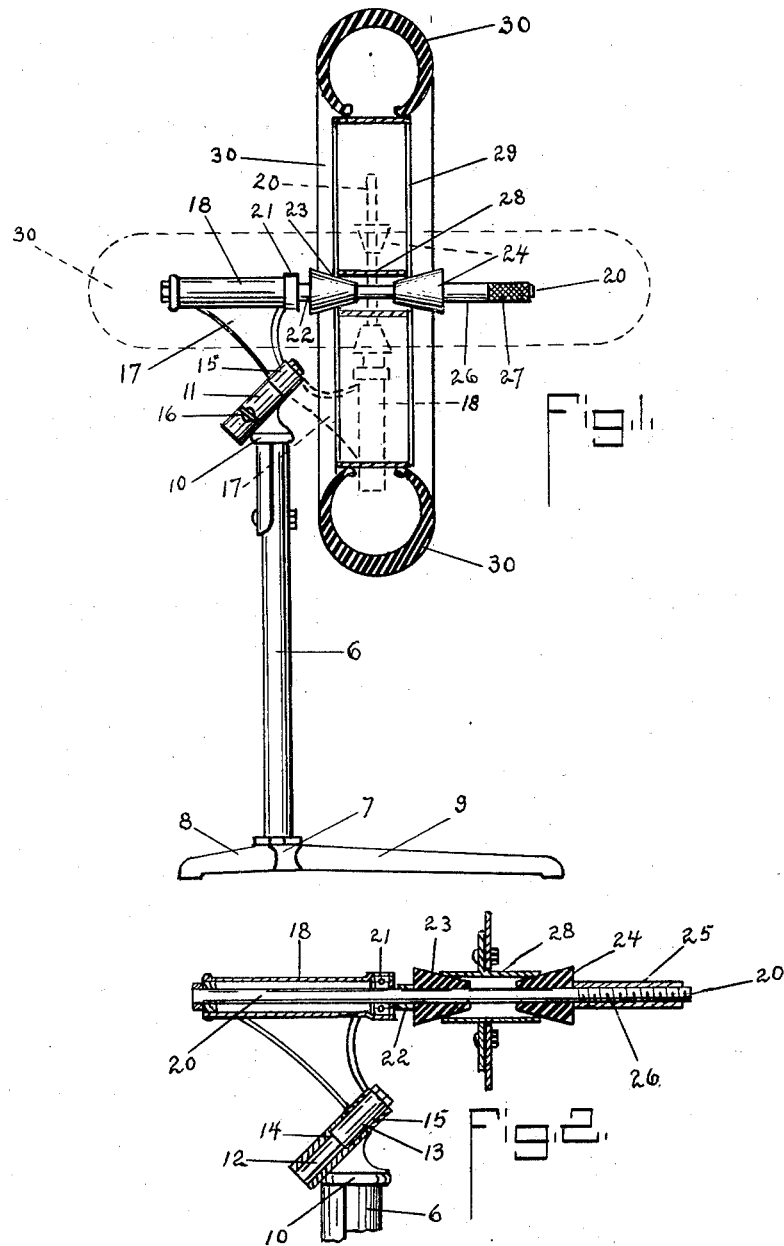
INVENTOR.
Henry Wochner.
BY Walter N. Haskell.
his ATTORNEY.

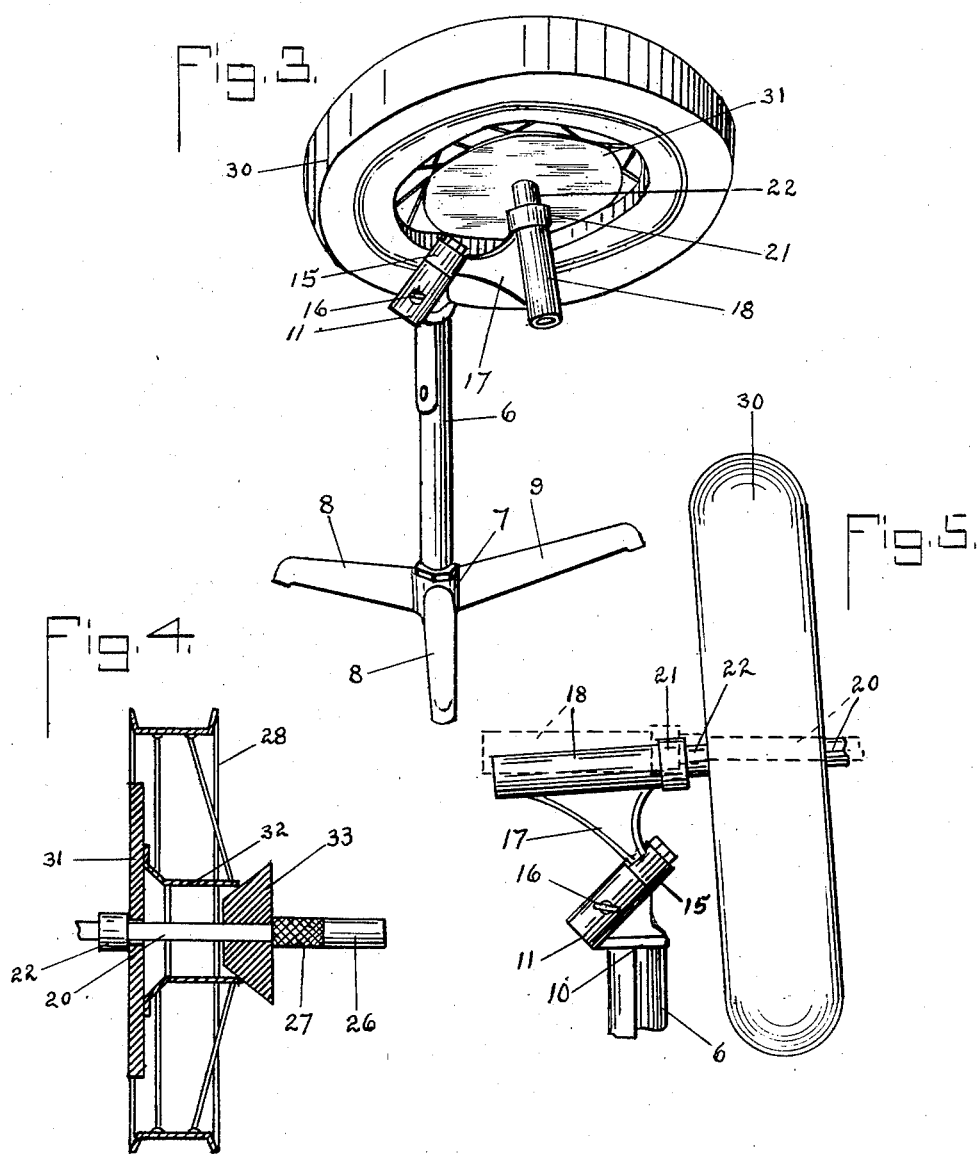

Patented May 10, 1938

2,117,073

UNITED STATES PATENT OFFICE 2,117,073

WHEEL BALANCING MECHANISM

Henry Wochner, Rock Island, Ill., assignor to Bear Manufacturing Company, Rock Island, Ill.

Application July 15, 1935, Serial No. 31,336

2 Claims. (Cl. 73—51)

My invention has reference to a wheel balancing apparatus, the chief purpose of which is to provide a means for supporting one of the wheels of a motor vehicle so that it may rotate freely, in a plane such that any variations from a perfect balance of the wheel can be detected, and necessary corrections made therein. It frequently happens that one side of a wheel is heavier than the other, which condition is detrimental to an efficient operation of the wheel. The supporting means consists primarily of a stand and a wheel supporting unit including a spindle on which the wheel is mounted for rotation in a vertical plane. When thus supported, if the wheel fails to balance perfectly the part which is heavier will move downwardly by force of gravity, and the fault may be overcome by the attachment of suitable counterweights to the lighter side of the wheel, until the same rotates with precision and perfect balance.

It has been found to be an advantage to have the wheel supporting unit arranged so that its position can be shifted, so as to support the wheel in either a vertical position or horizontal position, as desired, the latter position being found to be convenient for mounting the wheel on the machine or removing the same therefrom. One way in which this has been accomplished was by hingeably connecting the wheel supporting unit to a stand, with a spindle capable of being held in either a vertical or horizontal position, and with means for stopping the movement of the unit at either end of its movement. This resulted in a sudden stoppage at each end of the movement, with a tendency of bending or breakage of some of the parts, especially when the weight of a wheel and tire was added to that of the apparatus.

In the present invention the wheel supporting unit is supported so as to be capable of a revolutionary movement, about a central fixed pivot, the rotation of said unit about said pivot being effective in shifting the position of the spindle part thereof from a horizontal position to a vertical one and back again, with an easy swinging action. It is also possible to interrupt such movement at any point, and if desired, support the spindle in a diagonal position for placing a wheel thereon or removing the same. This is more convenient than with the spindle in a vertical position. The device is also provided with means for locking the wheel support in any of its adjusted positions.

The method of supporting the wheel unit is of such a character, that such unit and its load are practically self-balancing, the poise thereof being disturbed only by force applied to the rim of the wheel. The line of the pivotal axis and that of the spindle axis have a variation of forty-five degrees, or practically so. If desired, the angle of variation can be increased by a degree or so, so that instead of the wheel being held in a positive vertical position, it will have the amount of tilt or camber which such wheels usually have. As a result a more certain test of the action of the wheel can be made, in the position which it actually occupies when in use.

It has been the practice to not only support a wheel for rotation on a spindle or shaft, but to center such wheel on the spindle by means of conical bearings, installed in the bore of a wheel hub at opposite ends thereof. By this means it is possible to not only determine if a wheel is in proper balance, but also detect other faults, such as the wheel running out of true and the like. The possibility of positioning the wheel in a variety of planes, from vertical to horizontal, gives greater facility to tests and operations to be performed thereon.

The above named, and other features and advantages of the invention, will more fully appear from the following specification, taken in connection with the following drawings, in which;—

Fig. 1 shows the invention in side elevation, with a shifted position thereof in broken lines.

Fig. 2 shows the head of the machine, with the parts in longitudinal section.

Fig. 3 is a perspective view, with the machine in one position for mounting a wheel thereon.

Fig. 4 shows a modified form of the invention, in medial section.

Fig. 5 shows the head of a machine and wheel mounted thereon, in another shifted position.

The invention includes a support, consisting of a standard 6, the lower end of which is fixed in a base 7, provided with a pair of relatively short legs 8 and a leg 9 of greater length. Fixed to the upper end of the standard 6 is a socket 10, on which is mounted a diagonally disposed cylinder 11, in which is mounted rotatably a shaft 12, with an enlarged portion 13 which has a bearing against a shoulder 14 in the bore of the cylinder. Fixed to the part 13 is a collar 15 of the same diameter as the cylinder 11, and in one wall of the cylinder 11 is a thumb-screw 16, by means of which the shaft 12 can be held from rotation.

A sleeve 18 is connected with the collar 15 by means of a web 17, and within said sleeve is rotatably mounted a spindle 20, projecting outwardly through an enlargement 21, containing an anti-friction unit. The relative positioning of the axis of the shaft 12 and that of the spindle 20 is such as to form an angle between the same of approximately forty-five degrees, with the spindle 20 in a normally horizontal position, as shown in Figs. 1 and 2. Supported on the spindle is a pair of cones 23 and 24, oppositely disposed, the cone 23 being separated from the sleeve 18 by a collar 22, and the outer end of the spindle 20 being threaded to receive a sleeve-nut 26, provided through a portion of its length with a knurl 27. The cones 23 and 24 are in engagement with the hub 28 of a motor vehicle wheel 29, fitted with a tire 30. By a continued movement of the nut 26 the hub is frictionally engaged by the cones, causing the hub and wheel to rotate therewith.

For more speedy operation the nut 26 is internally threaded through only a portion of its length, preferably within the knurled end, and is in effect a combination nut and sleeve. For use with wheels of ordinary thickness the nut is used with the knurled end outwardly, as shown in the figures, and for heavier wheels, which call for a wider spacing of the cones, the position of the nut is reversed, and the knurled end brought into contact with the outer cone. A considerably less number of revolutions of the nut in seating or unseating the same is therefore required than if the nut were threaded for its entire length.

In Fig. 4 the inner part of a wheel is shown with the central hub removed, which sometimes occurs, as by leaving such hub attached to the drum casing. In this showing the inner cone is replaced by a disk 31, against which the inner flange of a shell 32 bears. The outer cone 24 is replaced by a cone 33 of greater size, which engages the outer end of the shell 32. The parts can be tightly assembled by the nut 26 as before, with the knurled end of the nut turned inwardly. By giving to the sleeve 18 a half rotation about the shaft 12 the spindle will be brought into a vertical position, as shown in broken lines in Fig. 1, with the wheel in a horizontal position. This can be accomplished by swinging the wheel support and its load either clockwise or anti-clockwise, and by a continued circular movement such parts can be brought back to the starting point. It will be noted that in this revolutionary action the plane of movement will be at right angles with the pivot, and diagonal to the horizontal plane upon which the machine is supported. It will also be evident that many variations in the positioning of the supporting sleeve 18 can be had, each degree of variation changing the angle of inclination of the support.

In Fig. 3 the support 18 is shown swung to one side and downwardly until the spindle is pointing upwardly and in a position for the convenient placing of a wheel thereon. In Fig. 5 the sleeve is shown moved a little downwardly from a horizontal position, (indicated in broken lines) and with the wheel in approximately the position of a reverse camber. If desired, the spread of the spindle and pivot can be around forty-seven degrees, giving a slight inclination to the spindle, and resulting camber of the wheel opposite to that shown. In case of such inclination, a horizontal position of sleeve 18 can be attained by moving said sleeve downwardly for a couple of degrees. The farther the sleeve is moved downwardly to one side or the other the greater is the degree of inclination, until the spindle points straight upwardly.

When the spindle 20 is in an operative position as shown in Fig. 1 it is preferably disposed in parallel relation with the longer foot 9 of the stand, and as the sleeve 18 is rotated the spindle is turned to one side or the other of such foot, until it again comes in line therewith in its vertical position.

Changes can be made in the construction and arrangement of the various parts of the machine without departing from the spirit thereof, as set forth and claimed herein.

What I claim and desire to secure, is:—

1. A wheel balancing machine, comprising a vertical support, a pivot rotatably mounted on said support at an angle of forty-five degrees with the ground, a spindle mounting supported by said pivot, a wheel supporting spindle in said mounting at an angle of forty-five degrees with said pivot, means for supporting a wheel on said spindle, and means for locking said pivot from movement at any point in its movement.

2. A wheel balancing machine, comprising a support, a pivotal member mounted on said support at an angle of forty-five degrees with the ground, and provided with an enlargement at one of its ends, a spindle mounting fixed to said enlargement, a spindle carried by said mounting with its axis in the same plane with the axis of the pivot, and at an angle therewith to permit a revolutionary movement of the spindle about the pivot, and means on said spindle for the support of a wheel.

HENRY WOCHNER.